United States Patent
Wang et al.

(10) Patent No.: US 12,524,562 B2
(45) Date of Patent: *Jan. 13, 2026

(54) SYSTEMS AND METHODS FOR REMOTELY STORING SECURITY CREDENTIALS IN CLOUD COMPUTING SYSTEMS FEATURING PARTITIONED NETWORK STRUCTURES

(71) Applicant: Capital One Services, LLC, McLean, VA (US)

(72) Inventors: Jinlian Wang, Falls Church, VA (US); Peter Zeller, McLean, VA (US); Christopher Schultz, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 407 days.

This patent is subject to a terminal disclaimer.

(21) Appl. No.: 18/163,747

(22) Filed: Feb. 2, 2023

(65) Prior Publication Data

US 2024/0265128 A1 Aug. 8, 2024

(51) Int. Cl.
*G06F 21/62* (2013.01)
*G06F 9/54* (2006.01)
*G06F 21/60* (2013.01)
*H04L 9/40* (2022.01)

(52) U.S. Cl.
CPC .......... *G06F 21/6227* (2013.01); *G06F 9/547* (2013.01); *G06F 21/602* (2013.01); *H04L 63/08* (2013.01)

(58) Field of Classification Search
USPC .......................................... 713/165
See application file for complete search history.

(56) References Cited

U.S. PATENT DOCUMENTS

| | | | | |
|---|---|---|---|---|
| 9,251,114 | B1 * | 2/2016 | Ancin | H04L 63/10 |
| 10,037,330 | B1 * | 7/2018 | Burshteyn | G06F 16/122 |
| 10,097,624 | B1 * | 10/2018 | Palladino | H04L 67/10 |
| 10,701,037 | B2 * | 6/2020 | Subbarayan | H04L 41/0813 |
| 10,846,411 | B2 * | 11/2020 | Horowitz | G06F 9/54 |
| 12,093,426 | B2 * | 9/2024 | LaFever | H04L 9/3297 |

(Continued)

FOREIGN PATENT DOCUMENTS

KR 10-2011-0134682 12/2011

OTHER PUBLICATIONS

International Search Report and Written Opinion issued in International Application No. PCT/US2024/013867 on May 8, 2024.

(Continued)

*Primary Examiner* — Kambiz Zand
*Assistant Examiner* — Mahabub S Ahmed
(74) *Attorney, Agent, or Firm* — Foley & Lardner LLP

(57) ABSTRACT

Systems and methods generate requests for encrypted (e.g., secured) credentials and data using one of a plurality of API plugins that are selected based on an access protocol for a network partition at which requested data is determined to be stored. Through the use of the dynamically-selected API plugins, the systems and methods may provide the aforementioned functions while being compatible with the different access protocols that may be encountered when providing central management across a diverse spectrum of user accounts, networks, and/or cloud platforms.

20 Claims, 5 Drawing Sheets

(56) References Cited

U.S. PATENT DOCUMENTS

| | | | | |
|---|---|---|---|---|
| 2002/0147771 A1* | 10/2002 | Traversat | ............... | G06F 9/544 |
| | | | | 709/250 |
| 2005/0027871 A1* | 2/2005 | Bradley | ................. | H04L 67/51 |
| | | | | 709/227 |
| 2008/0243979 A1* | 10/2008 | Cherkauer | ............ | G06F 21/606 |
| | | | | 708/303 |
| 2009/0300199 A1* | 12/2009 | Burns | .................... | H04L 69/14 |
| | | | | 709/227 |
| 2011/0314270 A1* | 12/2011 | Lifliand | ................. | H04L 63/30 |
| | | | | 713/151 |
| 2013/0145447 A1* | 6/2013 | Maron | ................... | G06F 21/31 |
| | | | | 726/6 |
| 2014/0122892 A1* | 5/2014 | Corbett | ................ | H04L 63/123 |
| | | | | 713/181 |
| 2014/0289797 A1* | 9/2014 | Trani | ..................... | H04L 63/08 |
| | | | | 726/3 |
| 2015/0154418 A1* | 6/2015 | Redberg | ................ | H04L 63/20 |
| | | | | 713/165 |
| 2016/0269408 A1* | 9/2016 | Chan | ................... | H04L 63/0428 |
| 2016/0277374 A1* | 9/2016 | Reid | ................... | H04L 63/0435 |
| 2016/0352867 A1* | 12/2016 | Subbarayan | ............ | H04L 63/08 |
| 2017/0149740 A1* | 5/2017 | Mansour | ............... | H04L 9/0825 |
| 2018/0082076 A1* | 3/2018 | Murray | ................... | H04L 63/10 |
| 2018/0359161 A1* | 12/2018 | Bai | ..................... | G06F 9/44526 |
| 2020/0272912 A1* | 8/2020 | Chacko | ................... | G06F 9/547 |
| 2021/0382875 A1* | 12/2021 | Wyner | ................ | H04L 9/3239 |
| 2022/0050921 A1* | 2/2022 | LaFever | ................ | G16H 10/60 |
| 2023/0246724 A1* | 8/2023 | Pateromichelakis | ....................... | |
| | | | | H04W 72/0453 |
| | | | | 370/329 |
| 2023/0254152 A1* | 8/2023 | Ratnakaram | ........... | G06Q 20/30 |
| | | | | 726/7 |
| 2023/0305907 A1* | 9/2023 | Yang | ....................... | G06F 9/54 |
| 2023/0379310 A1* | 11/2023 | Rubenstein | ........... | H04L 69/321 |
| 2024/0134356 A1* | 4/2024 | Nixon | ................ | G05B 19/4185 |
| 2024/0171564 A1* | 5/2024 | Fynaardt | ................ | G06F 9/541 |

OTHER PUBLICATIONS

Kumar M. Mohan et al., "Privacy Authentication Using Key Attribute-Based Encryption in Mobile Cloud Computing," 2017 IOP Conf. Ser.: Mater. Sci. Eng. 263 042069, DOI 10.1088/1757-899X/263/4/042069, Nov. 1, 2017.

* cited by examiner

SYSTEMS AND METHODS FOR REMOTELY STORING SECURITY CREDENTIALS IN CLOUD COMPUTING SYSTEMS FEATURING PARTITIONED NETWORK STRUCTURES

BACKGROUND

Cloud computing, the practice of using a network of remote servers hosted on the internet to store, manage, and process data, rather than a local server or a personal computer, is increasingly gaining steam. Key benefits to the use of cloud computing are its flexibility and scalability as users are no longer required to invest in physical resources. Moreover, as the use of mobile devices, and the type of work conducted on the go increases, the ability to access data remotely, an inherent feature of cloud computing, becomes even more valuable. As data is increasingly stored throughout the cloud, the need to maintain that data securely also increases. One solution for securing data is to secure it in network locations that require specific credentials, application programming interface ("API") keys, and/or other encryption/decryption measures. However, as these credentials, API keys, and/or other encryption/decryption measures become increasingly more numerous and complex, a need arises for a mechanism for managing, retrieving, and/or rotating the credentials, API keys, and/or other encryption/decryption measures, themselves.

SUMMARY

Systems and methods are described herein for novel uses and/or improvements to cloud computing, in particular improvements to security and security credential management. For example, as the credentials and/or other secrets (e.g., passwords, API keys, security certificates, etc.) required to access cloud data systems become more complex, a need arises to not only securely store data in a cloud computing system, but to also securely store the credentials and other secrets that are required to access this data.

One solution to storing this data is to rely on a solution that is native to the cloud computing system itself. For example, users may not only use the cloud computing system to securely store data, but the users may also rely on the cloud computing system to store the credentials required to access that data. As such, a conventional approach may be to provide a user with "a password to access a password." While this redundancy offers some additional security, this redundancy also creates additional secured data that requires management. In view of this, conventional systems often rely on a two-factor authentication approach where access to secured data is secured behind biometric or other authentication approaches provided by a known device.

However, this solution is not feasible for managing numerous sets of credentials, which may relate to different users, accounts, and/or cloud computing platforms, as the biometric authentication and known devices may not be the same across all sets of credentials. Furthermore, such a solution requires individual governance, management, and monitoring of each set of credentials.

In contrast to the aforementioned solution, the systems and methods use an abstraction layer built upon a suite of application programming interfaces ("APIs") to provide centrally managed security, monitoring (including for both risk and compliance measures), and/or management for secured data. In particular, the systems and methods are fully compatible with securing data across diverse networks featuring partitioned network structures (e.g., different networks, user accounts, cloud platforms, datasets, and/or of collections of data) that may each have different access protocols (e.g., requirements, specifications, and/or workflows) for accessing data stored therein.

Despite these benefits, a novel technical problem to providing a system that may perform the aforementioned functions for securing data across partitioned network structures is that each partitioned network structure may comprise its own unique, and likely proprietary, access protocol. These access protocols may not only require specific security credentials to access data, but the access protocols may also require requests to access data be conducted in a specific manner (e.g., requests made in a specific format, meeting specific security and/or specification requirements, use specific clients, etc.).

To overcome this novel technical problem, the systems and methods generate requests for encrypted (e.g., secured) credentials and data using one of a plurality of API plugins that are selected based on an access protocol for a network partition at which requested data is determined to be stored. Through the use of the dynamically-selected API plugins, the systems and methods may provide the aforementioned functions while being compatible with the different access protocols that may be encountered when providing centralized management across a diverse spectrum of user accounts, networks, and/or cloud platforms.

In some aspects, systems and methods for remotely storing security credentials in cloud computing systems featuring partitioned network structures with respective access protocols using dynamically-selected API plugins are described. For example, the system may receive, at an abstraction layer, a first request, from a first device, for a first encrypted data file, wherein the first encrypted data file is stored on a second device of a plurality of devices comprising a cloud computing system. The system may in response to the first request, determine, by the abstraction layer, a first network partition of the cloud computing system that comprises the first encrypted data file. The system may determine a first access protocol for the first network partition. The system may select, based on the first access protocol, a first API plugin from a plurality of API plugins. The system may generate, using the first API plugin, a second request corresponding to the first access protocol. The system may query, using the second request, the cloud computing system for the first encrypted data file. The system may generate for display, on a user interface of the first device, a first decrypted data file corresponding to the first encrypted data file.

Furthermore, as the use of the dynamically-selected API plugins allows access to the partitioned network structures, the system may additionally make request for information on one or more characteristics of usage or storage of data in the cloud computing system (e.g., as housed in a "usage file"). The system may then compare this information to requirements of the system to provide recommendations to provide the centrally managed security, monitoring (including for both risk and compliance measures), and/or management for secured data.

In some aspects, systems and methods of remotely monitoring secured data in cloud computing systems featuring partitioned network structures with respective access protocols using dynamically-selected API plugins are described. For example, the system may receive, at an abstraction layer, a first notification related to a first usage file for a first encrypted data, wherein the first encrypted data is stored on a plurality of devices comprising a cloud computing system, and wherein the first usage file indicates one or more characteristics of usage or storage of the first encrypted data in the cloud computing system. The system may in response to the first notification, determine, by the abstraction layer, a first network partition of the cloud computing system that comprises the first encrypted data. The system may determine a first access protocol for the first network partition. The system may select, based on the first access protocol, a first API plugin from a plurality of API plugins. The system may retrieve, using the first API plugin, the first usage file. The system may generate for display, on a user interface, a first recommendation based on the first usage file.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
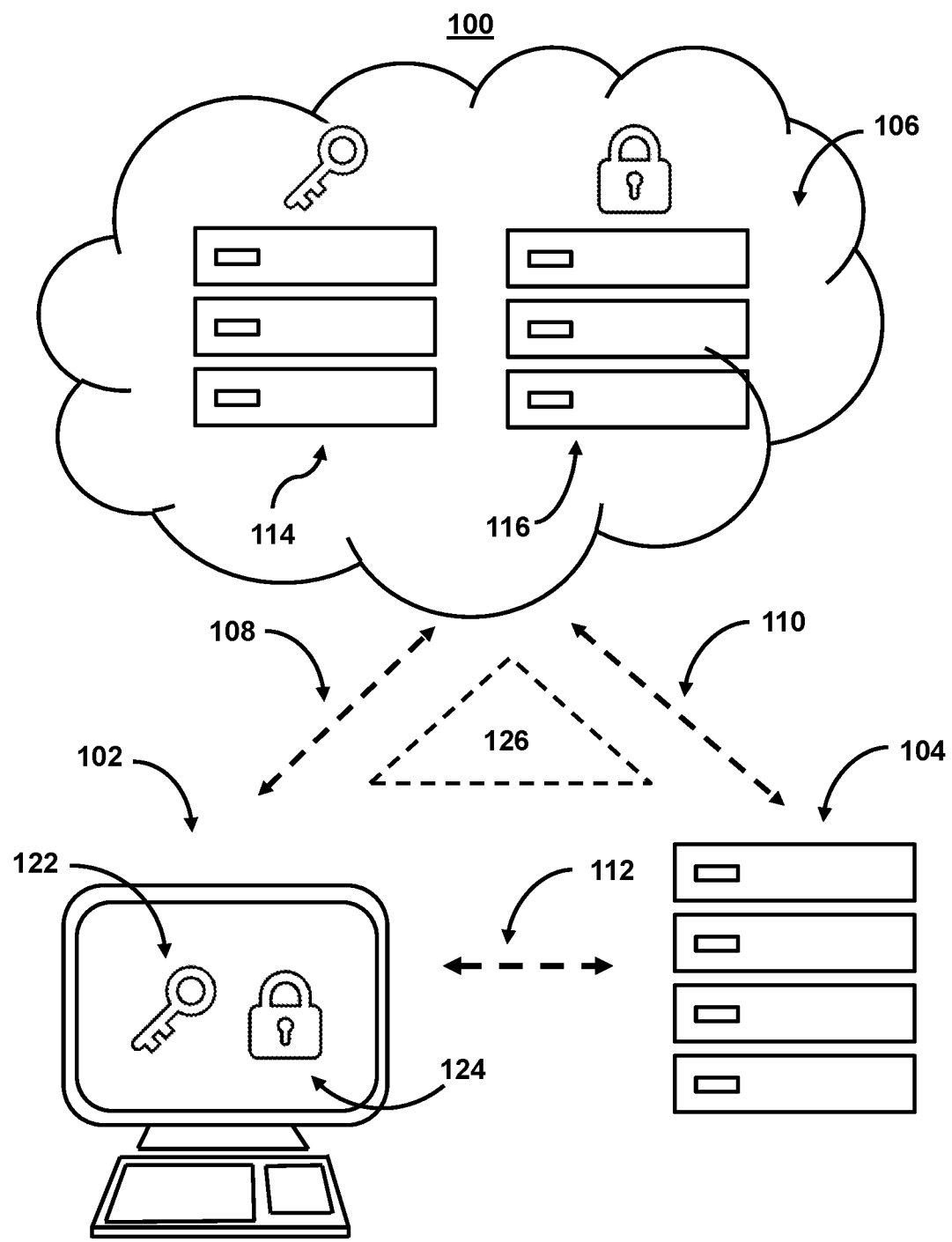
FIG. 1 shows an illustrative system for storing security credentials in cloud computing systems, in accordance with one or more embodiments.

FIG. 1 shows an illustrative diagram for storing security credentials in cloud computing systems, in accordance with one or more embodiments. For example, FIG. 1 shows system 100 for storing security credentials in cloud computing systems, in accordance with one or more embodiments. As shown in FIG. 1, system 100 may include client device 102, client device 104 or other components. Each of client devices 102 and 104 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 102 and 104 may include a desktop computer, a notebook computer, a tablet computer, a smartphone, a wearable device, or other client device. Users may for instance, utilize one or more client devices 102 and 104 to interact with one another, one or more servers, or other components of system 100. It should be noted that, while one or more operations are described herein as being performed by particular components of client devices 102 or 104, those operations may in some embodiments, be performed by other components of client devices 102 or 104 or other components of system 100. As an example, while one or more operations are described herein as being performed by components of client device 102, those operations may in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

As shown in FIG. 1, client device 102 may comprise a user interface for transmitting requests and receiving data. For example, system 100 may remotely store or monitor security credentials in cloud computing systems featuring partitioned network structures with respective access protocols using dynamically-selected API plugins. For example, a user may access credentials (e.g., data 122) that may be used to retrieve data (e.g., data 124) stored in cloud computing system 106. Furthermore, data 122 and data 124 may be stored in cloud computing system 106.

For example, the system may receive, at an abstraction layer, a first request, from a first device, for a first encrypted data file, wherein the first encrypted data file is stored on a second device of a plurality of devices comprising a cloud computing system. In some embodiments, the encrypted data file may comprise content such as encrypted data that is securely stored such as API keys, passwords, certificates, and other sensitive data. The system may encrypt this data in order to store it securely on a cloud-based system. For example, the system may encrypt data by scrambling data so that only authorized parties may understand the information. For example, the system may convert human-readable plaintext to incomprehensible text (e.g., ciphertext). As such, the system takes readable data and alters it so that it appears random. In some embodiments, the system may require the use of a cryptographic key, which may be a set of mathematical values that both a sender and a recipient of an encrypted message agree on.

The system may use symmetric encryption and/or asymmetric encryption. In symmetric encryption, there is only one key, and all communicating parties use the same (secret) key for both encryption and decryption. In asymmetric, or public key, encryption, there are two keys: one key is used for encryption, and a different key is used for decryption. The decryption key is kept private (hence the "private key" name), while the encryption key is shared publicly, for anyone to use (hence the "public key" name). Asymmetric encryption is a foundational technology for TLS (often called SSL).

The abstraction layer may comprise a fully managed cloud-based, zero-knowledge platform for securing infrastructure secrets such as API keys, database passwords, access keys, certificates and any type of confidential data. As shown in FIG. 1, API layer 126 may comprise an abstraction layer. API layer 126 may comprise an abstraction layer that performs one or more functions related to storing and/or monitoring security credentials and/or other secured data in cloud computing systems.

API layer 126 (or a respective plugin thereof) may allow the system to generate recommendations across different devices. API layer 126 (which may be A REST or Web services API layer) may provide a decoupled interface to data and/or functionality of one or more applications. API layer 126 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 126 may use various architectural arrangements. For example, system 100 may be partially based on API layer 126, such that there is strong adoption of SOAP and RESTful Web-services, using resources like Service Repository and Developer Portal, but with low governance, standardization, and separation of concerns. Alternatively, system 100 may be fully based on API layer 126, such that separation of concerns between layers like API layer 126, services, and applications are in place.

In some embodiments, the system architecture may use a microservice approach. Such systems may use two types of layers: Front-End Layer and Back-End Layer where microservices reside. In this kind of architecture, the role of the API layer 126 may provide integration between Front-End and Back-End. In such cases, API layer 126 may use RESTful APIs (exposition to front-end or even communication between microservices). API layer 126 may use AMQP (e.g., Kafka, RabbitMQ, etc.). API layer 126 may use incipient usage of new communications protocols such as gRPC, Thrift, etc.

In some embodiments, the system architecture may use an open API approach. In such cases, API layer 126 may use commercial or open source API Platforms and their modules. API layer 126 may use a developer portal. API layer 126 may use strong security constraints applying WAF and DDoS protection, and API layer 126 may use RESTful APIs as standard for external integration.

API layer 126 may also access one or more API plugins. As described herein, an API plugin may be a component of an API that defines a function template for the API parser and API server to work with a third-party system (e.g., a cloud computing system). API layer 126 may select from available API plugins based on one or more characteristics. For example, API layer 126 may determine an API plugin for a first access protocol for the first network partition (e.g., a first user account, cloud computing platform, etc.). Additionally or alternatively, API layer 126 may determine an API plugin corresponding to a first device (e.g., client device 102). For example, API layer 126 may select a first API plugin from a plurality of API plugins that corresponds to the first API and the first access protocol.

For example, an access protocol may comprise passwords, access codes, technical specifications, connectivity standards or protocols, and/or other relevant or related procedures that are necessary to allow the system (or any authorized users) to access the encrypted data file. In some embodiments, an access protocol may be specific to a hardware or software system. For example, the system may determine whether a particular device (or type of device) may access a network partition. To do so, the system may retrieve an identifier for the hardware and/or software and compare the identifier to one or more identifiers approved by the access protocol. In some embodiments, the system may determine whether a particular API plugin may access a network partition. To do so, the system may retrieve an identifier for the API plugin and compare the identifier to one or more identifiers approved by the access protocol.

In some embodiments, the system may require a particular API to access the network partition. For example, the system may determine whether a particular API plugin may access a network partition. To do so, the system may retrieve an identifier for the API plugin and compare the identifier to one or more identifiers approved by the access protocol.

In some embodiments, an API may also include a back-end routing component, a database where the application may store data, and/or a dedicated server that may access the Internet. In some embodiments, the system may use these "API characteristics" to determine whether or not a given API may be used to access a network partition. For example, the network partition may establish security and/or other requirements for access.

For example, the system may select an API plugin that both conforms to the API of a requesting device as well as the access protocol. An API plugin may comprise a component to define a function template for an API parser and/or API server to work with a third-party system. The API plugin may support both read and write functions, allowing users to view, create, and/or modify the content.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications networks or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As referred to herein, a network partition may comprise any partitioning of one or more computers, accounts, and/or other groups. In some embodiments, the network partition may comprise a network domain, which itself may comprise an administrative grouping of multiple private computer networks or local hosts within the same infrastructure. In such cases, the system may identify domains using a domain name and/or a globally unique name within the Domain Name System (DNS). Additionally or alternatively, the system may act as a domain controller that automates the logins, user groups, and architecture of a domain, rather than manually coding this information on each host in the domain.

Communication paths 108, 110, and 112 may define a network and/or a network partition. In some embodiments, the network partition may comprise a subset of accounts (e.g., corresponding to a particular user, entity, and/or group of users/entities). In such cases, a user account may be created, by the system, for a person in a computer or computing system. The system may also create user accounts for machine entities, such as service accounts for running programs, system accounts for storing system files and processes, and root and administrator accounts for system administration.

In some embodiments, the network partition may comprise a cloud computing platform. In such cases, a cloud computing platform may refer to the operating system and/or hardware of a server in an Internet-based data center. The platform may allow software and hardware products to coexist remotely and at scale.

Furthermore, as the use of the dynamically-selected API plugins allows access to the partitioned network structures, the system may additionally make request for information on one or more characteristics of usage or storage of data in the cloud computing system (e.g., as housed in a "usage file"). The system may then compare this information to requirements of the system to provide recommendations to provide the centrally managed security, monitoring (including for both risk and compliance measures), and/or management for secured data.

For example, the system may receive, at abstraction layer 126, a first request, from a first device, to retrieve a first usage file for a first encrypted data, wherein the first encrypted data is stored on a cloud computing system, and wherein the first usage file indicates one or more characteristics of usage or storage of the first encrypted data in the cloud computing system. In some embodiments, the system may access one or more usages files corresponding to the access and/or use of one or more cloud services. The usage file may be specific to a particular group, entity, dataset, secret, network partition, etc. For example, the system may receive a request for a usage file corresponding to a particular user account that indicates the access to and use of secured data for the account. In another example, the system may receive a request for a usage file corresponding to a particular device that indicates the access to and use of secured data for the device. In another example, the system may receive a request for a usage file corresponding to a particular network partition that indicates the access to and use of secured data for the network partition. In another example, the system may receive a request for a usage file corresponding to a particular user account that indicates information about the access and use of the secured data.

In some embodiments, the usage file may indicate one or more access and/or usage characteristics over a given time period. For example, server 114 (FIG. 1) may receive a first usage file from a first cloud services recipient (client device 102 (FIG. 1)), in which the first usage file includes cloud resources accessed by a user during a first time period (e.g., a given hour, day, week, etc.). For example, the usage file may indicate what data was accessed during a particular time period as well as the frequency at which the data was accessed.

In some embodiments, the usage file may include one or more characteristics of usage or storage of data in the cloud computing system. For example, the one or more characteristics of usage or storage of data may include any data, metadata, and/or other information related to how data is stored or used, what data is stored or used, when (including a frequency of) data is stored or used, and/or other characteristics of the data that may distinguish it from other data as well as the storing and use of the other data.

In FIG. 1, client device 102 may represent the client device of a first cloud computing systems recipient. For example, the cloud computing system may be made available to multiple client devices (e.g., end users) on-demand via the Internet (e.g., path 108 or 110) from a cloud computing system (e.g., server 114 and server 116) as opposed to end users using servers at the end user's location and/or owned by the end user. It should be noted that cloud computing system 106 includes server 114 and server 116; however, cloud computing system 106 may include additional components. In some embodiments, server 114 and server 116 may represent edge servers that are geographically close to a representative client device. In such embodiments, edge server 114 and edge server 116 may be further connected to a central server in cloud computing system 106. The central server may assign and select server 114 and/or server 116 to a given client device, application, and/or end user based on the geographic location of the client device with respect to the edge server, based on the network conditions along a given network path, and/or other quality of service conditions on the network. Furthermore, server 114 and server 116 may store different information and/or represent respective network partitions. For example, server 114 may store access credentials (e.g., data 122) and server 116 may store data accessed by the credentials (e.g., data 124).

As shown in FIG. 1, a user may use a user interface on client device 102 to access data and/or other content. As referred to herein, a "user interface" may comprise a human-computer interaction and communication in a device, and may include display screens, keyboards, a mouse, and the appearance of a desktop. For example, a user interface may comprise a way a user interacts with an application or a website to access content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

Cloud computing system 106 may be structured according to one or more service-oriented architecture models. For example, cloud computing system 106 may be designed to provide easy, scalable access to applications, resources and services, and are designed to be fully managed by a cloud computing systems provider. In particular, cloud computing system 106 may dynamically scale to meet the needs of client device 102 and client device 104. In some embodiments, the cloud computing system 106 may supply some or all cloud resources (e.g., hardware and software necessary for all or some of the operation of one or more cloud computing systems) to cloud computing systems recipients. The cloud computing systems provider may provide cloud computing systems such as online data storage and backup solutions, Web-based email services, hosted office suites and document collaboration services, database processing, managed technical support services, and/or general computer power and data processing. In some embodiments, the cloud resource may be a network, server, storage device, application and/or service. Notably, cloud computing system models may use a multitude of different formats, each with their own benefits and weaknesses, to both the cloud computing systems provider and the cloud computing systems recipient. In most models, these benefits and weaknesses are balanced based on the needs and/or business goals of the cloud computing systems provider and the cloud computing systems recipient. However, through the sharing of estimated and actual usage data of cloud computing systems recipients and the cloud computing systems provider, including the information on application usage in that data, the cloud computing systems provider and the cloud computing systems recipient may better balance these weaknesses and benefits. In particular, this balance allows the cloud computing systems provider and the cloud computing systems recipient to switch from one model to another and/or to deviate from traditional model formats. These deviations can be accomplished through the apportionment methods described below. For example, by analyzing information included in the shared data (e.g., information about one or more applications that use the cloud resources), the cloud computing systems provider may categorize the applications and/or the functions of those applications into authorized and unauthorized uses, the determination of which is used to further efficiently apportion the cloud computing systems resources.

For example, cloud computing system 106 may be structured according to an infrastructure as a service ("IaaS") model in which online services that provide high-level APIs are used to dereference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines and have the ability to scale services up and down according to the end users varying requirements. In such embodiments, the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating system images and their application software on the cloud infrastructure. In this model, the end user patches and maintains the operating systems and the application software, and the end user has access to virtual machines, servers, storage, load balances, etc.

Cloud computing system 106 may also be structured as a platform as a service ("PaaS") model. In such embodiments, cloud computing system 106 deploys onto the cloud infrastructure consumer-created or acquired applications created using programming languages, libraries, services, and tools supported by the cloud computing systems provider. The end user does not manage or control the underlying cloud infrastructure including network, servers, operating systems, or storage, but has control over the deployed applications and possibly configuration settings for the application-hosting environment. In this model, the end users do not manage or control the underlying cloud infrastructure including network, servers, operating systems, or storage, but have control over the deployed applications and possibly configuration settings for the application-hosting environment, and the end user has access to execution runtime code, databases, web servers, development tools, etc.

Cloud computing system 106 may also be structured as a software as a service ("SaaS") model. In such embodiments, cloud computing system 106 allows the end user to use the cloud computing systems provider's applications running on a cloud infrastructure. The applications are accessible from various client devices through either a thin client interface, such as a web browser (e.g., web-based email), or a program interface. The end user does not manage or control the underlying cloud infrastructure including network, servers, operating systems, storage, or even individual application capabilities, with the possible exception of limited user-specific application configuration settings.

Depending on the model or models used by the cloud computing systems provider, the manner in which cloud computing systems are apportioned may change. For example, in a PaaS model, in order to apportion the cloud computing system resources, the cloud computing system 106 may install one or more applications of the first cloud computing systems recipient on hardware of a cloud computing systems provider. In another example, in a SaaS model, in order to apportion the cloud computing system resources, cloud computing system 106 may set one or more limits for input/output operations per second for one or more applications of the first cloud computing systems recipient.

It should be noted that in some embodiments, the cloud computing system may apportion cloud computing system resources according to those accustomed with other models. For example, as stated below, cloud computing system 106 may receive output files that include specific information that allows cloud computing system 106 to better predict actual usage of a cloud computing systems recipient, as well as authorized use. Because cloud computing system 106 is better able to predict actual and/or authorized use, cloud computing system 106 may apportion cloud computing systems using techniques not accustomed to that model. For example, in a SaaS model, cloud computing system 106 may install one or more applications of the first cloud computing systems recipient on hardware of a cloud computing systems provider. In another example, in a PaaS model in order to apportion the cloud computing system resources, cloud computing system 106 may set one or more limits for input/output operations per second for one or more applications of the first cloud computing systems recipient.

Figure 2:
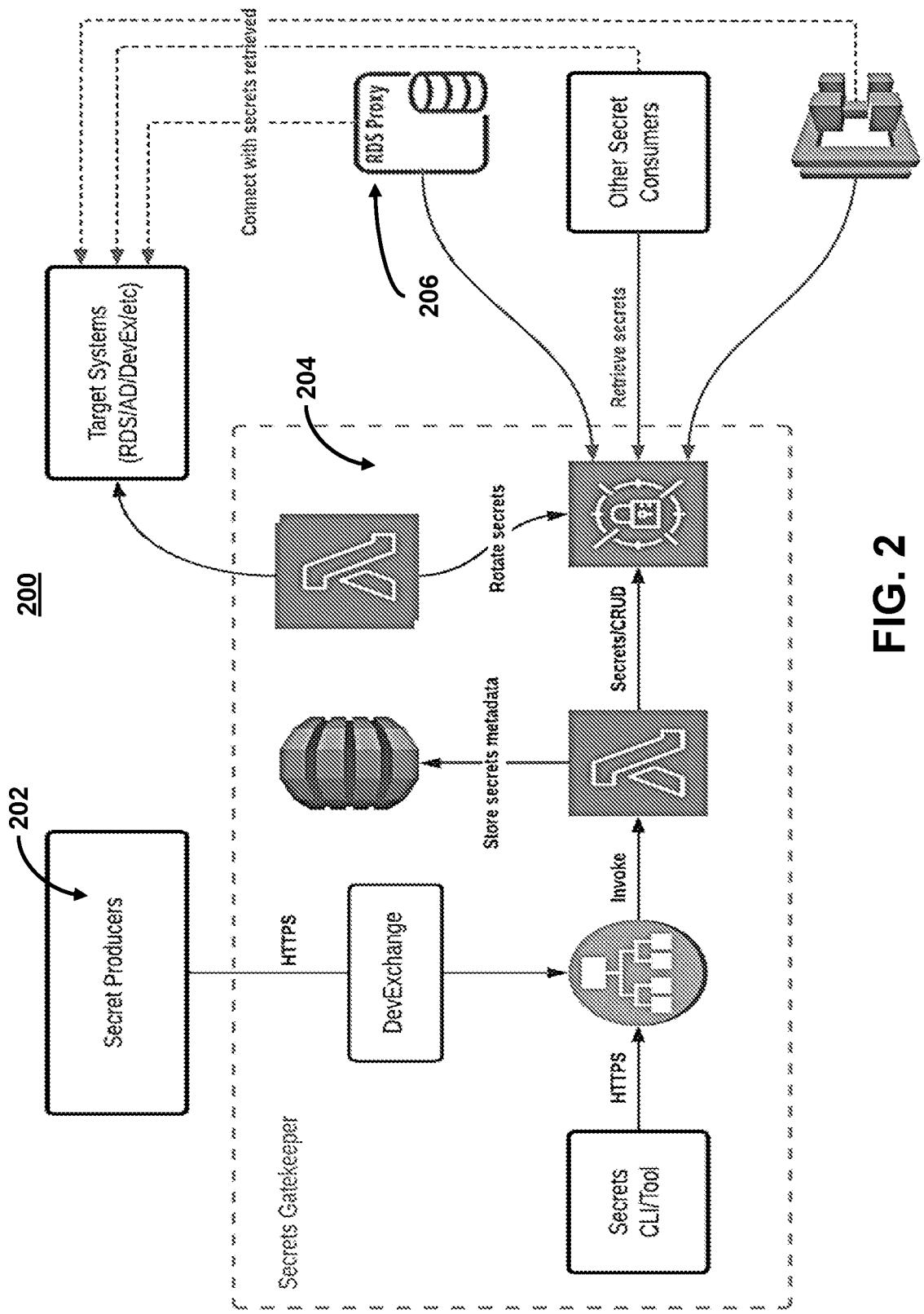
FIG. 2 shows an illustrative diagram for an architecture for storing credentials in cloud computing systems, in accordance with one or more embodiments.

FIG. 2 shows an illustrative diagram for an architecture for storing credentials in cloud computing systems, in accordance with one or more embodiments. For example, system 200 may represent an architecture for remotely monitoring security credentials (and/or storing secured data) in cloud computing systems featuring partitioned network structures with respective access protocols using dynamically-selected API plugins.

For example, system 200 may comprise a secret data producer 202 in communication with abstraction layer 204. Abstraction layer 204, which may comprise an API layer, an API, and/or an API plugin that may transmit a set of Hypertext Transfer Protocol (HTTP) request messages and a definition of the structure of response messages. In some embodiments, the API may allow a software application, which is written against the API and installed on a client (such as, for example, a computing device associated with a user) to exchange data with a server (such as, for example, a computing system associated with a cloud computing system) that implements the API, in a request-response pattern. In certain embodiments, the request-response pattern defined by the API may be configured in a synchronous fashion and require for the response to be provided in real time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content-type. In another embodiment, the API design may also require the server implementing the API to return messages in JSON format in response to the request calls from the client.

Through the use of one or more communications, secret data producer 202 and abstraction layer 204 may function to store secured data, rotate and/or refresh stored data, and/or perform other functions. In some embodiments, the system may require a particular client (e.g., proxy 206) to access the network partition. For example, the system may determine whether a particular client may access a network partition. To do so, the system may retrieve an identifier for the client and compare the identifier to one or more identifiers approved by the access protocol. For example, the system may select, based on the first access protocol, a first computer client of a plurality of computer clients. The system may then determine to query the cloud computing system for the first encrypted data file using the first computer client as a proxy.

The client may be a piece of computer hardware or software that accesses a service made available by a server as part of the client-server model of computer networks. The server may be another computer system, in which case the client accesses the service by way of the network. For example, the system may require the request for data is transmitted using a specific client in order to improve security.

Figure 3:
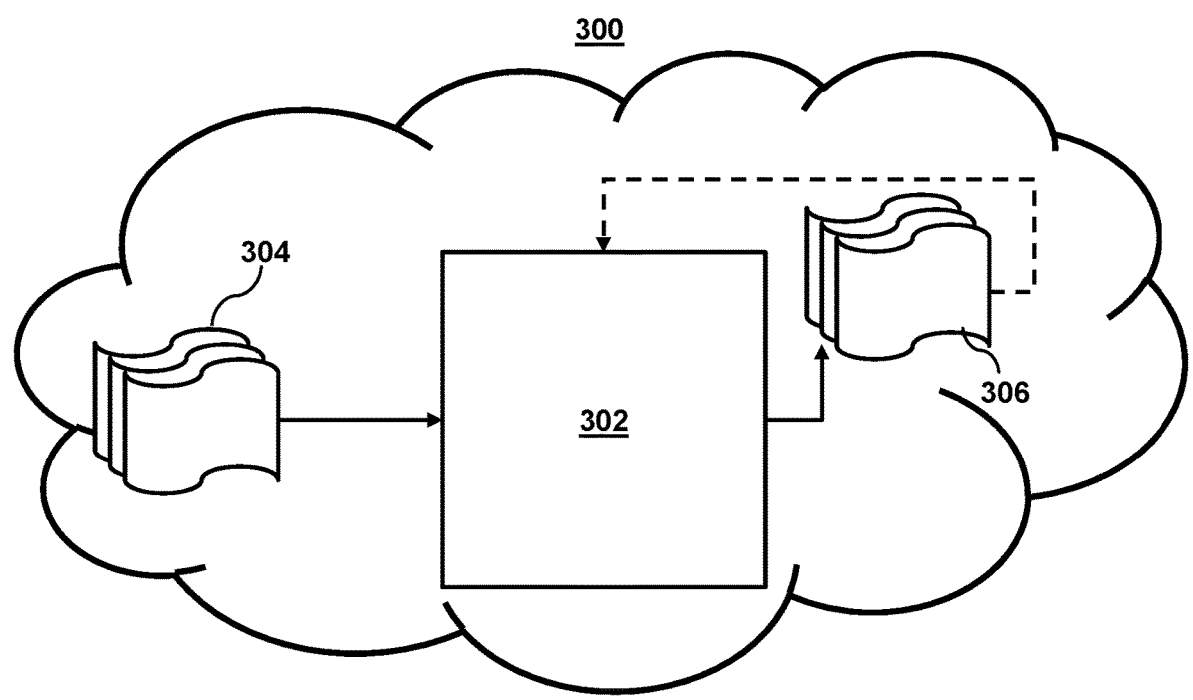
FIG. 3 shows illustrative components for a system used to generate usage files, in accordance with one or more embodiments.

FIG. 3 shows an artificial intelligence model configured to generate usage files, in accordance with one or more embodiments. System 300 includes artificial intelligence model 302 that may take inputs 304 and provide outputs 306. For example, inputs may include information received from output files such as an actual amount of cloud resources used by a first cloud computing systems recipient during a first time period and first time period application information. The first time period application information may include information about one or more applications that used cloud resources during the first time period. This information may further include specific information that may be accessible. For example, the information may include lengths of code of one or more applications that used cloud resources and/or a number of function calls of one or more applications that used cloud resources. This information may be compared to similar information from different time periods to determine peculiarities in the applications.

For example, cloud computing systems recipients may in some instances use cloud resources in an unauthorized manner. This unauthorized manner may include a use that is illegal and/or against the terms of use of the cloud computing system. By monitoring this information, the system may detect these unauthorized uses. In another example, the terms of service of the cloud computing systems provider may prevent the use of cloud resources for commercial use, training machine learning algorithms, mining cryptocurrencies, and/or other resource-intensive operations. By monitoring the length of code and/or function calls, the system may determine when these unauthorized uses are occurring. For example, the cloud computing systems provider may monitor the average length of code of an application performing a given function from one time period to another to detect discrepancies. Likewise, the cloud computing systems provider may monitor the average number of function calls of an application performing a given function from one time period to another to detect discrepancies. If the length of code and/or function calls increases/decreases at a given time period, which has correlations to higher performance of a second cloud computing systems recipient, the cloud computing systems provider may detect the unauthorized use. Slight deviations as well as compensating for the actual uses of the first cloud computing systems recipient may in some embodiments, necessitate large datasets that may be interpreted by the machine learning model.

In another example, inputs may also include estimated and/or actual usage data as provided by cloud computing systems recipients during various time periods. This information may be compared to similar information from different time periods to predict periods of higher or lower use and/or the need for more cloud computing system resources, as well as the particular cloud computing systems recipients and/or types of cloud computing systems recipients that may experience the high or low period of use. Additionally, the system may determine particular cloud computing systems recipients that have similar patterns of use. For example, if the system determines that client devices (e.g., client device 102 (FIG. 1) and client device 104 (FIG. 1)) are associated with cloud computing systems recipients that both have a high amount of use during a given time period (e.g., a weekend), the system (e.g., cloud computing system 106 (FIG. 1)) may select different physical hosts and/or physical hosts located along different network routes in order to minimize resource strain. For example, in response to this determination, the system may select a first cloud computing systems physical host (e.g., server 114 (FIG. 1)) for the first cloud computing systems recipient (e.g., client device 102

(FIG. 1)) for a time period and a second cloud computing systems physical host (e.g., server 116 (FIG. 1)) for the second cloud computing systems recipient (e.g., client device 104 (FIG. 1)) for the time period, based on the amount of cloud resources apportioned to the first cloud computing systems recipient for the time period and on the amount of cloud resources apportioned to the second cloud computing systems recipient for the time period (e.g., based on the predicted actual and/or authorized use of each cloud computing systems recipient).

In one use case, outputs 306 may be fed back to artificial intelligence model 302 as input to train artificial intelligence model 302 (e.g., alone or in conjunction with user indications of the accuracy of outputs 306, labels associated with the inputs, or with other reference feedback information). In another use case, artificial intelligence model 302 may update its configurations (e.g., weights, biases, or other parameters) based on its assessment of its prediction (e.g., outputs 306) and reference feedback information (e.g., user indication of accuracy, reference labels, or other information). In another use case, where artificial intelligence model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may for example, be reflective of the magnitude of error propagated backward after a forward pass has been completed. In this way, for example, the artificial intelligence model 302 may be trained to generate better predictions.

In some embodiments, the system may use one or more prediction models to predict an actual and/or authorized use of secured data. The prediction model may include one or more artificial intelligence models, including, but not limited to, machine learning, deep learning, etc. (referred to collectively herein as artificial intelligence models, machine learning models, or simply models).

As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
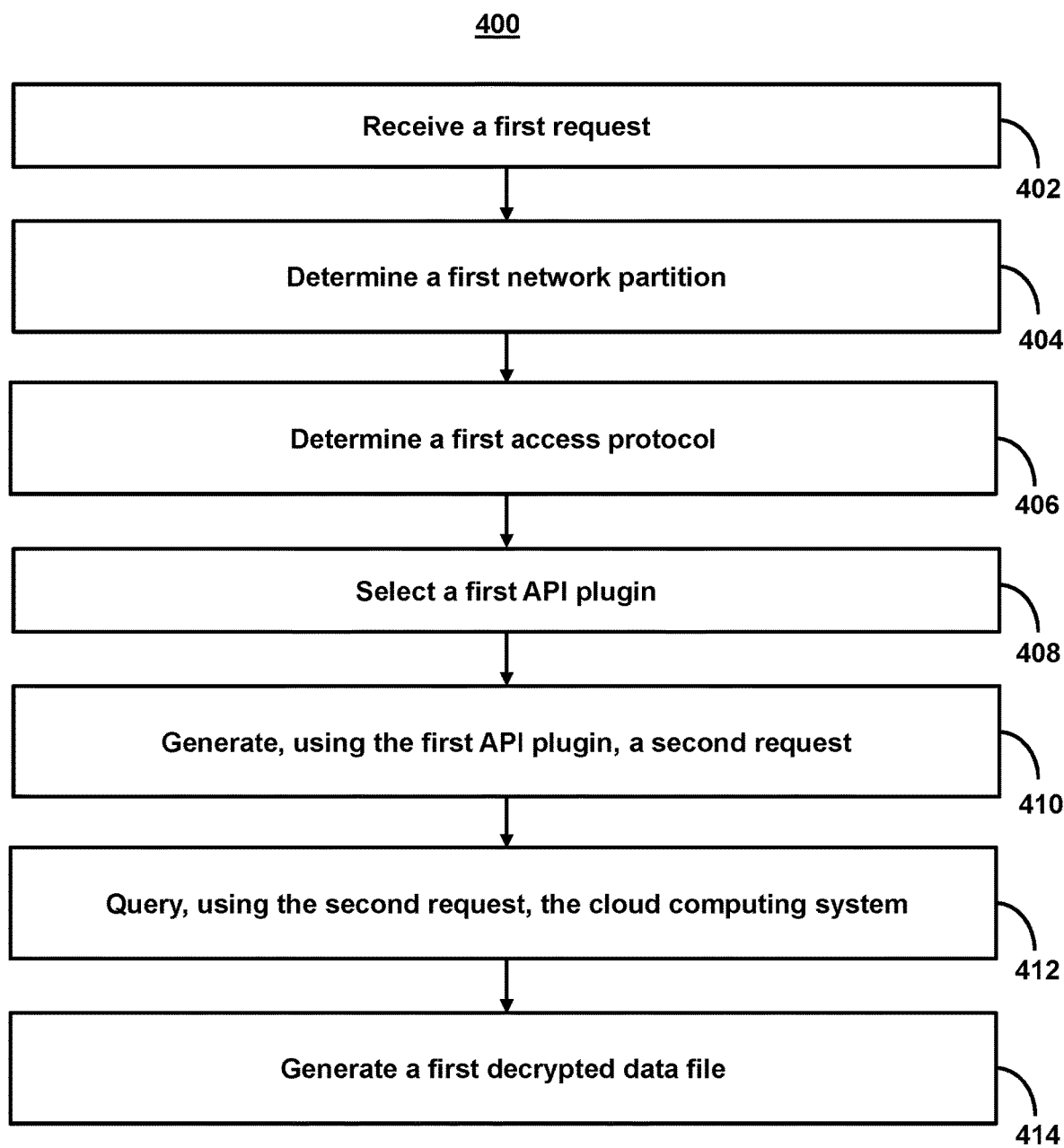
FIG. 4 shows a flowchart of the steps involved in remotely storing security credentials in cloud computing systems, in accordance with one or more embodiments.

FIG. 4 shows a flowchart of the steps involved in remotely storing security credentials in cloud computing systems, in accordance with one or more embodiments. For example, the system may use process 400 (e.g., as implemented on one or more system components described above) in order to remotely store security credentials in cloud computing systems featuring partitioned network structures with respective access protocols using dynamically-selected API plugins.

At step 402, process 400 (e.g., using one or more components described above) receives a first request. For example, the system may receive, at an abstraction layer, a first request, from a first device, for a first encrypted data file, wherein the first encrypted data file is stored on a second device of a plurality of devices comprising a cloud computing system. For example, the system may receive a request from a user to access a secret kept in an encrypted state in a cloud computing system.

In some embodiments, the system may receive notifications from the cloud computing system that secured data (e.g., a password, security certificate, etc.) is scheduled to be refreshed. Based on this schedule, the system may query the cloud computing system for the refreshed data. For example, the system may receive, at the abstraction layer, a data refreshment schedule for the first encrypted data file. The system may determine, at the abstraction layer, that the first encrypted data file has been refreshed based on the data refreshment schedule. The system may transmit, by the abstraction layer to the first device, a notification to retrieve the first usage file for the first encrypted data file.

At step 404, process 400 (e.g., using one or more components described above) determines a first network partition. For example, the system may in response to the first request, determine, by the abstraction layer, a first network partition of the cloud computing system that comprises the first encrypted data file. For example, in response to the first request, the system may determine where the requested data file is located (e.g., what network partition) as well as one or more characteristics of the network partition (e.g., an access protocol and/or one or more characteristics about the network partition).

In some embodiments, a network partition may comprise a user account. In such cases, the system may determine the user account that corresponds to the encrypted data file based on identifying a user account corresponding to the device (or user) making a request. The system may determine a particular account corresponding to the data based on an identifier transmitted in a request (e.g., entered manually or automatically), transmitted simultaneously with a request, and/or otherwise transmitted. For example, the system may receive a first device identifier corresponding to the first device. The system may determine a first user account corresponding to the first device identifier using a database, wherein the database comprises a listing of device identifiers corresponding to user accounts. The system may select the first network partition based on the first user account.

In some embodiments, a network partition may comprise a cloud platform. In such cases, the system may determine the cloud platform that corresponds to the encrypted data file based on identifying a cloud platform corresponding to the data at issue in a request. The system may determine a particular cloud platform corresponding to the data based on an identifier transmitted in a request (e.g., entered manually or automatically), transmitted simultaneously with a request, and/or otherwise transmitted. For example, the system may receive, in the first request, a platform identifier corresponding to the first encrypted data file. The system may determine a first cloud platform corresponding to the first encrypted data file using a database, wherein the database comprises a listing of cloud platforms storing respective data files. The system may select the first network partition based on the first cloud platform.

At step 406, process 400 (e.g., using one or more components described above) determines a first access protocol. For example, the system may determine the one or more requirements (e.g., a functional, security, and/or specification requirement) for accessing the network partition.

In some embodiments, the system may determine a secret management system for the network partition. For example, the cloud computing system may use one or more encrypted data management platforms (e.g., secret management platforms) to secure infrastructure secrets such as API keys, database passwords, access keys, certificates and any type of confidential data. In order to accommodate the plurality of different encrypted data management platforms that may be encountered, the system may determine the encrypted data management platform and determine the first access protocol based on the encrypted data management platform. For example, the system may determine an encrypted data management platform corresponding to the first network partition. The system may then determine the first access protocol based on the encrypted data management platform.

For example, an encrypted data management platform may be a secure and convenient storage system for API keys, passwords, certificates, and other sensitive data. The encrypted data management platform may provide a central place and single source of truth to manage, access, and audit secrets across cloud computing systems. For example, the encrypted data management platform may improve the system's security by removing hard-coded credentials from a program or application's source code.

At step 408, process 400 (e.g., using one or more components described above) selects a first API plugin. For example, the system may select, based on the first access protocol, a first API plugin from a plurality of API plugins. For example, in order to allow access to the encrypted data as well as to maintain security, the system may dynamically-select an API plugin for accessing the data. For example, the system may use multiple encryption techniques and/or access protocols each of which may correspond to a given network partition.

In some embodiments, the system may require a particular API to access the network partition. For example, the system may determine whether a particular API plugin may access a network partition. To do so, the system may retrieve an identifier for the API plugin and compare the identifier to one or more identifiers approved by the access protocol. For example, the system may determine a first API corresponding to the first device and determine that the first API plugin corresponds to the first API.

In some embodiments, the system may select the API plugin from a plurality of API plugins. In such cases, the system may first determine a subset of available API plugins that are compatible with the first access protocol. The system may then filter the compatible API plugins for any API plugins that are also compatible with the API of the first device. For example, the system may determine a subset of API plugins of the plurality of API plugins that correspond to the first access protocol. The system may determine an API of the first device. The system may filter the subset of API plugins based on the API.

In some embodiments, the system may select the API plugin from a plurality of API plugins based on one or more factors. For example, the system may first determine a subset of available API plugins that used to access data of a given type. The system may then filter the compatible API plugins for any API plugins based on whether or not a given API plugin is configured for the given type of data. For example, the system may determine a type of content of the first encrypted data file. The system may determine a subset of API plugins of the plurality of API plugins that correspond to the type of content. The system may select the first API plugin from the subset of API plugins.

In some embodiments, the system may first determine a subset of available API plugins that are compatible with a requesting device. The system may then filter the compatible API plugins for any API plugins based on whether or not a given API plugin is configured for the device type. For example, the system may determine a device type of the first device. The system may determine a subset of API plugins of the plurality of API plugins that correspond to the device type. The system may select the first API plugin from the subset of API plugins.

In some embodiments, the system may select an API plugin based on processing, storage, and/or other computer resource requirements. For example, the system may determine how quickly data must be retrieved and the system may then select an API plugin that may provide that performance. For example, the system may determine a processing speed requirement of the first request. The system may determine a subset of API plugins of the plurality of API plugins that correspond to the processing speed requirement. The system may select the first API plugin from the subset of API plugins.

In some embodiments, the system may select an API plugin based on security requirements. For example, the system may determine data must be retrieved in a manner that maintains a required level of security. The system may then select an API plugin that provides that level of security. For example, the system may determine a security requirement of the first request. The system may determine a subset of API plugins of the plurality of API plugins that correspond to the security requirement. The system may select the first API plugin from the subset of API plugins.

At step 410, process 400 (e.g., using one or more components described above) generates, using the first API plugin, a second request. For example, the system may generate, using the first API plugin, a second request corresponding to the first access protocol. In some embodiments, the system may use the first API plugin to generate a request for accessing the encrypted data file. For example, the API plugin may provide a role-based access control model. In such cases, entities (e.g., systems, network partitions, users, course categories, courses, modules, datasets, accounts, and/or other segments of data) are represented by contexts that are arranged in a tree like hierarchy (e.g., a context tree). The system may use roles to set capability definitions for each request, in which each capability usually represents an ability of a user to do one or more functions. The system may also define roles at the topmost system context level. Alternatively or additionally, the system may dynamically determine role definitions that may be modified and/or changed at lower context levels. For example, a user access control may be calculated from the definitions of roles assigned to users.

At step 412, process 400 (e.g., using one or more components described above) queries, using the second request, the cloud computing system. For example, the system may query, using the second request, the cloud computing system for the first encrypted data file. For example, the system may then use a request that is generated to correspond to the access protocol for the specific network partition to request the encrypted data from the network partition.

In some embodiments, the system may require a particular client to access the network partition. For example, the system may determine whether a particular client may access a network partition. To do so, the system may retrieve an identifier for the client and compare the identifier to one or more identifiers approved by the access protocol. For example, the system may select, based on the first access protocol, a first computer client of a plurality of computer clients. The system may then determine to query the cloud computing system for the first encrypted data file using the first computer client as a proxy.

The client may be a piece of computer hardware or software that accesses a service made available by a server as part of the client-server model of computer networks. The server may be another computer system, in which case the client accesses the service by way of the network. For example, the system may require the request for data to be transmitted using a specific client in order to improve security.

At step 414, process 400 (e.g., using one or more components described above) generates a first decrypted data file. For example, the system may generate for display, on a user interface of the first device, a first decrypted data file corresponding to the first encrypted data file. For example, the system may generate the data in a human-readable format to allow a user on the first device to view, access, and/or otherwise use the data.

In some embodiments, the first decrypted data file may comprise a decryption key for a second encrypted data file. For example, the system may retrieve sensitive data such as passwords, database credentials, API keys, SSH Keys, and/or TLS Certifications. The system may allow a user to remotely retrieve this sensitive data and use the sensitive data to retrieve other data. For example, the system may generate, based on the decryption key, a third request for the second encrypted file. The system may query, using the third request, the cloud computing system for the second encrypted data file. The system may generate for display, on the user interface of the first device, a second decrypted data file corresponding to the second encrypted data file.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
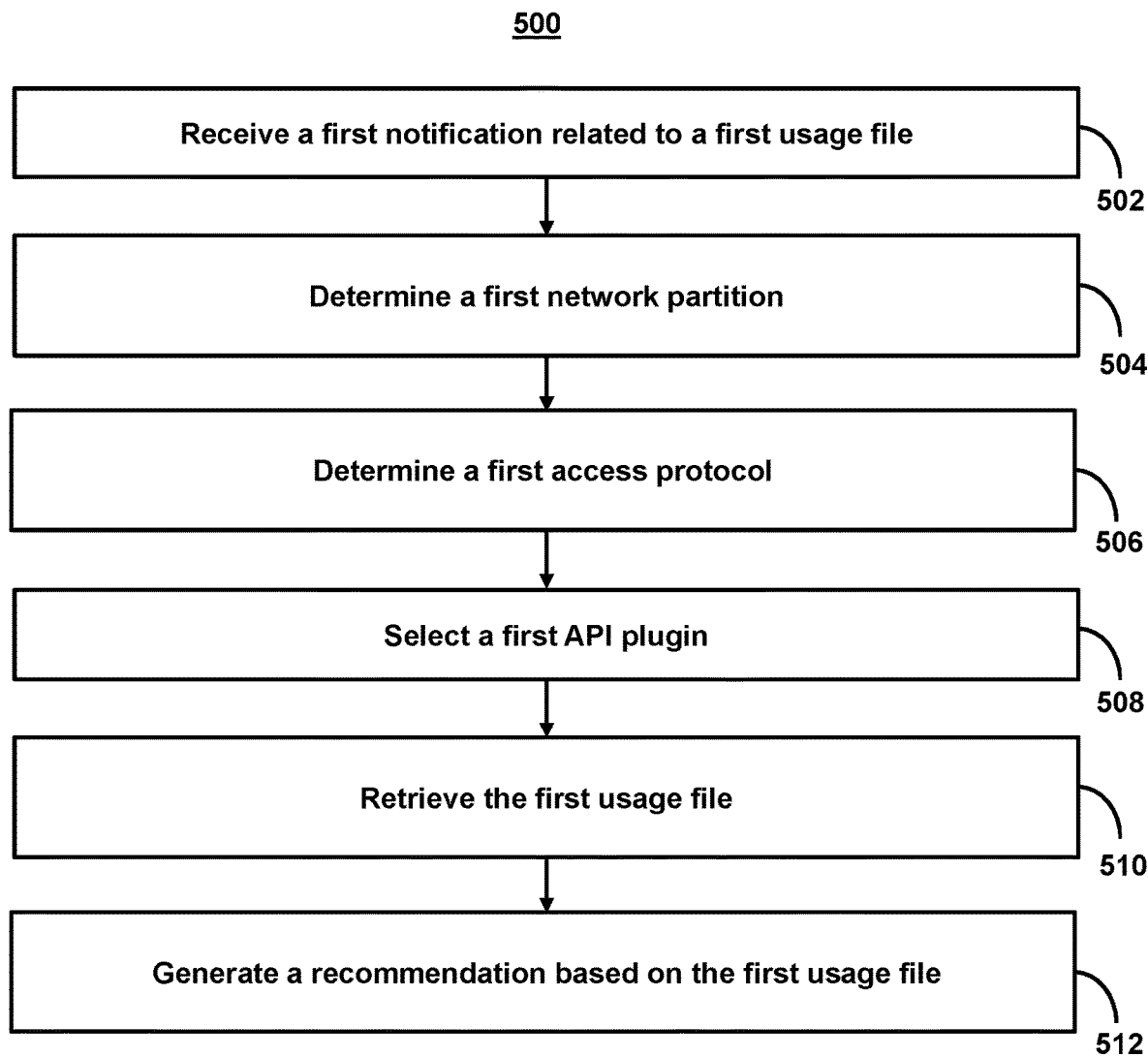
FIG. 5 shows a flowchart of the steps involved in remotely monitoring secured data in cloud computing systems, in accordance with one or more embodiments.

FIG. 5 shows a flowchart of the steps involved in remotely monitoring secured data in cloud computing systems, in accordance with one or more embodiments. For example, the system may use process 500 (e.g., as implemented on one or more system components described above) in order to remotely monitor secured data in cloud computing systems featuring partitioned network structures with respective access protocols using dynamically-selected API plugins.

At step 502, process 500 (e.g., using one or more components described above) receives a first notification related to a first usage file. For example, the system may receive, at an abstraction layer, a first notification related to a first usage file for a first encrypted data, wherein the first encrypted data is stored on a plurality of devices comprising a cloud computing system, and wherein the first usage file indicates one or more characteristics of usage or storage of the first encrypted data in the cloud computing system. For example, the system may comprise a fully managed cloud-based, zero-knowledge platform for securing infrastructure secrets such as API keys, database passwords, access keys, certificates and any type of confidential data. The abstraction layer may be used to monitor access and use of secured data in order to maintain security and detect breaches. As such, the system may receive a request for information about the usage and storage of data in the encrypted data file.

In some embodiments, the system may receive notifications from the cloud computing system that secured data (e.g., a password, security certificate, etc.) has been updated. In response, the system may query the cloud computing system for the updated data. For example, the system may in response to the first notification, transmit the first notification to a first user device. The system may receive, at the abstraction layer, a first request from the first device, to retrieve the first usage file for the first encrypted data file.

In some embodiments, the system may receive notifications from the cloud computing system that secured data (e.g., a password, security certificate, etc.) is scheduled to be refreshed. Based on this schedule, the system may query the cloud computing system for the refreshed data. For example, the system may receive, at the abstraction layer, a data refreshment schedule. The system may determine, at the abstraction layer, that the first encrypted data has been refreshed based on the data refreshment schedule. The system may transmit, by the abstraction layer, a first request, from a first device, to retrieve the first usage file for the first encrypted data.

At step 504, process 500 (e.g., using one or more components described above) determines a first network partition. For example, the system may in response to the first notification, determine, by the abstraction layer, a first network partition of the cloud computing system that comprises the first encrypted data. For example, in response to the first request, the system may determine where the requested data file is located (e.g., what network partition) as well as one or more characteristics of the network partition (e.g., an access protocol and/or one or more characteristics about the network partition). The system may use these characteristics to determine how to access the system in order to receive information about the use and storage of secured data.

In some embodiments, a network partition may comprise a user account. In such cases, the system may determine the user account that corresponds to the encrypted data file based on identifying a user account corresponding to the device (or user) making a request. The system may determine a particular account corresponding to the data based on an identifier transmitted in a request (e.g., entered manually or automatically), transmitted simultaneously with a request, and/or otherwise transmitted.

In some embodiments, a network partition may comprise a cloud platform. In such cases, the system may determine the cloud platform that corresponds to the encrypted data file based on identifying a cloud platform corresponding to the data at issue in a request. The system may determine a particular cloud platform corresponding to the data based on an identifier transmitted in a request (e.g., entered manually or automatically), transmitted simultaneously with a request, and/or otherwise transmitted.

At step 506, process 500 (e.g., using one or more components described above) determines a first access protocol.

For example, the system may determine a first access protocol for the first network partition. For example, the system may determine the one or more requirements (e.g., a functional, security, and/or specification requirement) for accessing the network partition. The system may use these requirements to determine how to access the system in order to receive information about the use and storage of secured data.

In some embodiments, the system may determine a secret management system for the network partition. For example, the cloud computing system may use one or more encrypted data management platforms (e.g., secret management platforms) to secure infrastructure secrets such as API keys, database passwords, access keys, certificates and any type of confidential data. In order to accommodate the plurality of different encrypted data management platforms that may be encountered, the system may determine the encrypted data management platform and determine the first access protocol based on the encrypted data management platform.

For example, an encrypted data management platform may be a secure and convenient storage system for API keys, passwords, certificates, and other sensitive data. The encrypted data management platform may provide a central place and single source of truth to manage, access, and audit secrets across cloud computing systems. For example, the encrypted data management platform may improve the system's security by removing hard-coded credentials from a program or application's source code.

At step 508, process 500 (e.g., using one or more components described above) selects a first API plugin. For example, the system may select, based on the first access protocol, a first API plugin from a plurality of API plugins. For example, in order to allow access to the encrypted data as well as to maintain security, the system may dynamically-select an API plugin for accessing the data. For example, the system may use multiple encryption techniques and/or access protocols each of which may correspond to a given network partition. The system may determine an API plugin which corresponds to these protocols. The system may then use the API plugin to retrieve the usage file.

At step 510, process 500 (e.g., using one or more components described above) retrieves the first usage file. For example, the system may retrieve, using the first API plugin, the first usage file. For example, the system may use the dynamically-selected API plugin to retrieve the first usage file. The dynamically-selected API plugin may interact with the cloud computing system to receive information about the storage and use of secured data.

For example, as the cloud computing system may use one or more security protocols, the system may use the dynamically-selected API plugin to generate a request that meets the protocol and then query the system with the request. The system may generate, using the first API plugin, a second request corresponding to the first access protocol. The system may query, using the second request, the cloud computing system for the first usage file.

At step 512, process 500 (e.g., using one or more components described above) generates a recommendation based on the first usage file. For example, the system may generate for display, on a user interface, a first recommendation based on the first usage file. For example, the system may generate a recommendation based on the one or more characteristics of usage or storage of the first encrypted data file. In some embodiments, the system may select information in the recommendation based on the initial request.

In some embodiments, the system may generate a recommendation that indicates a particular device that accessed specific data, network partitions, etc. For example, in response to a request that queries the system for this specific data, the system may generate a recommendation that responds to the query. In such cases, the system may receive the device identifier as part of the initial user request. For example, the system may request information on whether a specific device (or which devices) have accessed the secured data. For example, the system may retrieve from the first usage file a device identifier for a device that previously accessed the first encrypted data file. The system may determine the first recommendation based on the device identifier.

In some embodiments, the system may generate a recommendation that indicates a frequency at which specific data, network partitions, etc. was accessed. For example, in response to a request that queries the system for this specific data, the system may generate a recommendation that responds to the query. In such cases, the system may receive a time period as part of the initial user request. For example, the system may request information on a frequency at which data was accessed during the time period. For example, the system may retrieve from the first usage file a first frequency at which the first encrypted data is accessed from the cloud computing service. The system may determine the first recommendation based on the first frequency.

In some embodiments, the system may generate a recommendation that indicates whether or not securely stored data has been subject to a data breach. For example, in response to a request that queries the system for this specific data, the system may generate a recommendation that responds to the query. In such cases, the system may retrieve the specific data and compare it to data in known data breaches. For example, the system may generate the data in a human-readable format to allow a user on the first device to view, access, and/or otherwise use the data (e.g., compare it data in known data breaches). For example, the system may generate a first decrypted data file corresponding to the first encrypted data. The system may compare the first decrypted data file to data in known data breaches to determine whether the first encrypted data is subject to a data breach.

In some embodiments, the system may generate a recommendation that indicates a particular location (e.g., network partition) at which specific data is stored. For example, in response to a request that queries the system for this specific data, the system may generate a recommendation that responds to the query. In such cases, the system may receive the network partition identifier when determining the first network partition of the cloud computing system that comprises the first encrypted data. For example, the system may request information on where specific data is stored. For example, the system may retrieve from the first usage file a network partition identifier for the first network partition. The system may determine the first recommendation based on the network partition identifier.

In some embodiments, the system may generate a recommendation that indicates the one or more operations (e.g., read, write, etc.) that were performed on specific data, network partitions, etc. For example, in response to a request that queries the system for this specific data, the system may generate a recommendation that responds to the query. In such cases, the system may determine what operations (if any) were performed on the data as part of the initial user request. The system may then generate a log of the one or more operations. For example, the system may retrieve from the first usage file an operation log of operations performed on the first encrypted data. The system may determine the first recommendation based on the operation log.

In some embodiments, the system may generate a recommendation that indicates a frequency at which secured data is refreshed. For example, refreshing data (or changing passwords, security protocols, security certificates, etc.) is a key element of maintaining a high level of security. For example, in response to a request that queries the system for this specific data, the system may generate a recommendation that responds to the query. In such cases, the system may receive a time period as part of the initial user request. For example, the system may request information on a frequency at which data was refreshed during the time period. For example, the system may retrieve from the first usage file a first frequency at which the first encrypted data is refreshed on the cloud computing service. The system may determine the first recommendation based on the first frequency.

In some embodiments, the system may generate a recommendation that indicates a particular type of security (or security requirements) through which specific data is stored. For example, in response to a request that queries the system for this specific data, the system may generate a recommendation that responds to the query. In such cases, the system may receive the access protocol identifier when determining the first access protocol of the cloud computing system that comprises the first encrypted data. For example, the system may retrieve from the first usage file an access protocol identifier for the first access protocol. The system may determine the first recommendation based on the access protocol identifier.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of remotely storing security credentials or monitoring secured data in cloud computing systems featuring partitioned network structures with respective access protocols using dynamically-selected application programming interface ("API") plugins.

2. The method of the preceding embodiment, further comprising: receiving, at an abstraction layer, a first request, from a first device, for a first encrypted data file, wherein the first encrypted data file is stored on a second device of a plurality of devices comprising a cloud computing system; in response to the first request, determining, by the abstraction layer, a first network partition of the cloud computing system that comprises the first encrypted data file; determining a first access protocol for the first network partition; selecting, based on the first access protocol, a first API plugin from a plurality of API plugins; generating, using the first API plugin, a second request corresponding to the first access protocol; querying, using the second request, the cloud computing system for the first encrypted data file; and generating for display, on a user interface of the first device, a first decrypted data file corresponding to the first encrypted data file.

3. The method of any one of the preceding embodiments, wherein selecting the first API plugin from the plurality of API plugins further comprises: determining a first API corresponding to the first device; and determining that the first API plugin corresponds to the first API.

4. The method of any one of the preceding embodiments, further comprising: selecting, based on the first access protocol, a first computer client of a plurality of computer clients; and determining to query the cloud computing system for the first encrypted data file using the first computer client as a proxy.

5. The method of any one of the preceding embodiments, wherein determining the first access protocol for the first network partition further comprises: determining an encrypted data management platform corresponding to the first network partition; and determining the first access protocol based on the encrypted data management platform.

6. The method of any one of the preceding embodiments, wherein the first decrypted data file comprises a decryption key for a second encrypted data file, and wherein the method further comprises: generating, based on the decryption key, a third request for the second encrypted data file; querying, using the third request, the cloud computing system for the second encrypted data file; and generating for display, on the user interface of the first device, a second decrypted data file corresponding to the second encrypted data file.

7. The method of any one of the preceding embodiments, wherein determining, by the abstraction layer, the first network partition of the cloud computing system that comprises the first encrypted data file further comprises: receiving a first device identifier corresponding to the first device; determining a first user account corresponding to the first device identifier using a database, wherein the database comprises a listing of device identifiers corresponding to user accounts; and selecting the first network partition based on the first user account.

8. The method of any one of the preceding embodiments, wherein determining, by the abstraction layer, the first network partition of the cloud computing system that comprises the first encrypted data file further comprises: receiving, in the first request, a platform identifier corresponding to the first encrypted data file; determining a first cloud platform corresponding to the first encrypted data file using a database, wherein the database comprises a listing of cloud platforms storing respective data files; and selecting the first network partition based on the first cloud platform.

9. The method of any one of the preceding embodiments, wherein selecting, based on the first access protocol, the first API plugin from the plurality of API plugins further comprises: determining a subset of API plugins of the plurality of API plugins that correspond to the first access protocol; determining an API of the first device; and filtering the subset of API plugins based on the API.

10. The method of any one of the preceding embodiments, wherein selecting, based on the first access protocol, the first API plugin from the plurality of API plugins further comprises: determining a type of content of the first encrypted data file; determining a subset of API plugins of the plurality of API plugins that correspond to the type of content; and selecting the first API plugin from the subset of API plugins.

11. The method of any one of the preceding embodiments, wherein selecting, based on the first access protocol, the first API plugin from the plurality of API plugins further comprises: determining a device type of the first device; determining a subset of API plugins of the plurality of API plugins that correspond to the device type; and selecting the first API plugin from the subset of API plugins.

12. The method of any one of the preceding embodiments, wherein selecting, based on the first access protocol, the first API plugin from the plurality of API plugins further comprises: determining a processing speed requirement of the first request; determining a subset of API plugins of the plurality of API plugins that correspond to the processing speed requirement; and selecting the first API plugin from the subset of API plugins.

13. The method of any one of the preceding embodiments, wherein selecting, based on the first access protocol, the first API plugin from the plurality of API plugins further comprises: determining a security requirement of the first request; determining a subset of API plugins of the plurality of API plugins that correspond to the security requirement; and selecting the first API plugin from the subset of API plugins.

14. The method of any one of the preceding embodiments, further comprising: receiving, at the abstraction layer, a data refreshment schedule for the first encrypted data file; determining, at the abstraction layer, that the first encrypted data file has been refreshed based on the data refreshment schedule; and transmitting, by the abstraction layer to the first device, a notification to retrieve the first encrypted data file.

15. The method of any one of the preceding embodiments, further comprising: receiving, at an abstraction layer, a first notification related to a first usage file for a first encrypted data, wherein the first encrypted data is stored on a plurality of devices comprising a cloud computing system, and wherein the first usage file indicates one or more characteristics of usage or storage of the first encrypted data in the cloud computing system; in response to the first notification, determining, by the abstraction layer, a first network partition of the cloud computing system that comprises the first encrypted data; determining a first access protocol for the first network partition; selecting, based on the first access protocol, a first API plugin from a plurality of API plugins; retrieving, using the first API plugin, the first usage file; and generating for display, on a user interface, a first recommendation based on the first usage file.

16. The method of any one of the preceding embodiments, further comprising: in response to the first notification, transmitting the first notification to a first user device; and receiving, at the abstraction layer, a first request, to retrieve the first usage file for the first encrypted data.

17. The method of any one of the preceding embodiments, further comprising: receiving, at the abstraction layer, a data refreshment schedule; determining, at the abstraction layer, that the first encrypted data has been refreshed based on the data refreshment schedule; and transmitting, by the abstraction layer, a first request, from a first device, to retrieve the first usage file for the first encrypted data.

18. The method of any one of the preceding embodiments, wherein retrieving, using the first API plugin, the first usage file further comprises: generating, using the first API plugin, a second request corresponding to the first access protocol; and querying, using the second request, the cloud computing system for the first usage file.

19. The method of any one of the preceding embodiments, wherein generating for display, on a user interface, a first recommendation based on the first usage file further comprises: retrieving from the first usage file a device identifier for a device that previously accessed the first encrypted data; and determining the first recommendation based on the device identifier.

20. The method of any one of the preceding embodiments, wherein generating for display, on a user interface, a first recommendation based on the first usage file further comprises: retrieving from the first usage file a first frequency at which the first encrypted data is accessed from the cloud computing service; and determining the first recommendation based on the first frequency.

21. The method of any one of the preceding embodiments, wherein generating for display, on a user interface, a first recommendation based on the first usage file further comprises: generating first decrypted data file corresponding to the first encrypted data; and comparing the first decrypted data file to data in known data breaches to determine whether the first encrypted data is subject to a data breach.

22. The method of any one of the preceding embodiments, wherein generating for display, on a user interface, a first recommendation based on the first usage file further comprises: retrieving from the first usage file a network partition identifier for the first network partition; and determining the first recommendation based on the network partition identifier.

23. The method of any one of the preceding embodiments, wherein generating for display, on a user interface, a first recommendation based on the first usage file further comprises: retrieving from the first usage file an operation log of operations performed on the first encrypted data; and determining the first recommendation based on the operation log.

24. The method of any one of the preceding embodiments, wherein generating for display, on a user interface, a first recommendation based on the first usage file further comprises: retrieving from the first usage file a first frequency at which the first encrypted data is refreshed on the cloud computing service; and determining the first recommendation based on the first frequency.

25. The method of any one of the preceding embodiments, wherein generating for display, on a user interface, a first recommendation based on the first usage file further comprises: retrieving from the first usage file an access protocol identifier for the first access protocol; and determining the first recommendation based on the access protocol identifier.

26. The method of any one of the preceding embodiments, wherein determining the first access protocol for the first network partition further comprises: determining an encrypted data management platform corresponding to the first network partition; and determining the first access protocol based on the encrypted data management platform.

27. The method of any one of the preceding embodiments, wherein determining, by the abstraction layer, the first network partition of the cloud computing system that comprises the first encrypted data further comprises: receiving a first device identifier corresponding to the first device; determining a first user account corresponding to the first device identifier using a database, wherein the database comprises a listing of device identifiers corresponding to user accounts; and selecting the first network partition based on the first user account.

28. The method of any one of the preceding embodiments, wherein determining, by the abstraction layer, the first network partition of the cloud computing system that comprises the first encrypted data further comprises: receiving a platform identifier corresponding to the first encrypted data; determining a first cloud platform corresponding to the first encrypted data using a database, wherein the database comprises a listing of cloud platforms storing respective data files; and selecting the first network partition based on the first cloud platform.

29. A tangible, non-transitory, machine-readable medium storing instructions that, when executed by a data processing apparatus, cause the data processing apparatus to perform operations comprising those of any of embodiments 1-28.

30. A system comprising one or more processors; and memory storing instructions that, when executed by the processors, cause the processors to effectuate operations comprising those of any of embodiments 1-28.

31. A system comprising means for performing any of embodiments 1-28.

What is claimed is:

1. A system of remotely monitoring secured data in cloud computing systems featuring partitioned network structures with respective access protocols using dynamically-selected application programming interface ("API") plugins, the system comprising:
one or more processors; and
a non-transitory, computer-readable medium comprising instructions recorded thereon that when executed by the one or more processors cause operations comprising:
receiving, at an abstraction layer, a first request, from a first device, to retrieve a first usage file for a first encrypted data, wherein the first encrypted data is stored on a cloud computing system, and wherein the first usage file indicates one or more characteristics of usage or storage of the first encrypted data in the cloud computing system;
in response to the first request, determining, by the abstraction layer, a first network partition of the cloud computing system that comprises the first encrypted data;
determining a first access protocol for the first network partition;
selecting, based on the first access protocol, a first API plugin from a plurality of API plugins;
generating, using the first API plugin, a second request corresponding to the first access protocol;
querying, using the second request, the cloud computing system for the first usage file;
retrieving from the first usage file an operation log of operations performed on the first encrypted data; and
generating for display, on a user interface, a first recommendation based on the operation log.

2. A method of remotely monitoring secured data in cloud computing systems featuring partitioned network structures with respective access protocols using dynamically-selected application programming interface ("API") plugins, the method comprising:
receiving, at an abstraction layer, a first notification related to a first usage file for a first encrypted data, wherein the first encrypted data is stored on a plurality of devices comprising a cloud computing system, and wherein the first usage file indicates one or more characteristics of usage or storage of the first encrypted data in the cloud computing system;
in response to the first notification, determining, by the abstraction layer, a first network partition of the cloud computing system that comprises the first encrypted data;
determining a first access protocol for the first network partition;
selecting, based on the first access protocol, a first API plugin from a plurality of API plugins;
retrieving, using the first API plugin, the first usage file; and
generating for display, on a user interface, a first recommendation based on the first usage file.

3. The method of claim 2, further comprising:
in response to the first notification, transmitting the first notification to a first user device; and
receiving, at the abstraction layer, a first request, to retrieve the first usage file for the first encrypted data.

4. The method of claim 2, further comprising:
receiving, at the abstraction layer, a data refreshment schedule;
determining, at the abstraction layer, that the first encrypted data has been refreshed based on the data refreshment schedule; and
transmitting, by the abstraction layer, a first request, from a first device, to retrieve the first usage file for the first encrypted data.

5. The method of claim 2, wherein retrieving, using the first API plugin, the first usage file further comprises:
generating, using the first API plugin, a second request corresponding to the first access protocol; and
querying, using the second request, the cloud computing system for the first usage file.

6. The method of claim 2, wherein generating for display, on a user interface, a first recommendation based on the first usage file further comprises:
retrieving from the first usage file a device identifier for a device that previously accessed the first encrypted data; and
determining the first recommendation based on the device identifier.

7. The method of claim 2, wherein generating for display, on a user interface, a first recommendation based on the first usage file further comprises:
retrieving from the first usage file a first frequency at which the first encrypted data is accessed from the cloud computing system; and
determining the first recommendation based on the first frequency.

8. The method of claim 2, wherein generating for display, on a user interface, a first recommendation based on the first usage file further comprises:
generating first decrypted data file corresponding to the first encrypted data; and
comparing the first decrypted data file to data in known data breaches to determine whether the first encrypted data is subject to a data breach.

9. The method of claim 2, wherein generating for display, on a user interface, a first recommendation based on the first usage file further comprises:
retrieving from the first usage file a network partition identifier for the first network partition; and
determining the first recommendation based on the network partition identifier.

10. The method of claim 2, wherein generating for display, on a user interface, a first recommendation based on the first usage file further comprises:
retrieving from the first usage file an operation log of operations performed on the first encrypted data; and
determining the first recommendation based on the operation log.

11. The method of claim 2, wherein generating for display, on a user interface, a first recommendation based on the first usage file further comprises:

retrieving from the first usage file a first frequency at which the first encrypted data is refreshed on the cloud computing system; and determining the first recommendation based on the first frequency.

12. The method of claim 2, wherein generating for display, on a user interface, a first recommendation based on the first usage file further comprises:

retrieving from the first usage file an access protocol identifier for the first access protocol; and determining the first recommendation based on the access protocol identifier.

13. The method of claim 2, wherein determining the first access protocol for the first network partition further comprises:

determining an encrypted data management platform corresponding to the first network partition; and determining the first access protocol based on the encrypted data management platform.

14. The method of claim 2, wherein determining, by the abstraction layer, the first network partition of the cloud computing system that comprises the first encrypted data further comprises:

receiving a first device identifier corresponding to a first device of the plurality of devices;

determining a first user account corresponding to the first device identifier using a database, wherein the database comprises a listing of device identifiers corresponding to user accounts; and selecting the first network partition based on the first user account.

15. The method of claim 2, wherein determining, by the abstraction layer, the first network partition of the cloud computing system that comprises the first encrypted data further comprises:

receiving a platform identifier corresponding to the first encrypted data;

determining a first cloud platform corresponding to the first encrypted data using a database, wherein the database comprises a listing of cloud platforms storing respective data files; and selecting the first network partition based on the first cloud platform.

16. A non-transitory, computer-readable medium comprising instructions recorded thereon that when executed by one or more processors cause operations comprising:

receiving, at an abstraction layer, a first notification related to a first usage file for a first encrypted data, wherein the first encrypted data is stored on a plurality of devices comprising a cloud computing system, and wherein the first usage file indicates one or more characteristics of usage or storage of the first encrypted data in the cloud computing system;

in response to the first notification, determining, by the abstraction layer, a first network partition of the cloud computing system that comprises the first encrypted data;

determining a first access protocol for the first network partition;

selecting, based on the first access protocol, a first application programming interface ("API") plugin from a plurality of API plugins;

retrieving, using the first API plugin, the first usage file; and generating for display, on a user interface, a first recommendation based on the first usage file.

17. The non-transitory, computer-readable medium of claim 16, further comprising:

in response to the first notification, transmitting the first notification to a first user device; and receiving, at the abstraction layer, a first request, to retrieve the first usage file for the first encrypted data.

18. The non-transitory, computer-readable medium of claim 16, further comprising:

receiving, at the abstraction layer, a data refreshment schedule;

determining, at the abstraction layer, that the first encrypted data has been refreshed based on the data refreshment schedule; and transmitting, by the abstraction layer, a first request, from a first device, to retrieve the first usage file for the first encrypted data.

19. The non-transitory, computer-readable medium of claim 16, wherein retrieving, using the first API plugin, the first usage file further comprises:

generating, using the first API plugin, a second request corresponding to the first access protocol; and querying, using the second request, the cloud computing system for the first usage file.

20. The non-transitory, computer-readable medium of claim 16, wherein generating for display, on a user interface, a first recommendation based on the first usage file further comprises:

retrieving from the first usage file a device identifier for a device that previously accessed the first encrypted data; and determining the first recommendation based on the device identifier.

* * * * *